(12) United States Patent
Fouchier

(10) Patent No.: US 8,079,093 B2
(45) Date of Patent: Dec. 13, 2011

(54) DUAL TIP ATOMIC FORCE MICROSCOPY PROBE AND METHOD FOR PRODUCING SUCH A PROBE

(75) Inventor: Marc Fouchier, Grenoble (FR)

(73) Assignee: IMEC, Leuven (BE)

( * ) Notice: Subject to any disclaimer, the term of this patent is extended or adjusted under 35 U.S.C. 154(b) by 201 days.

(21) Appl. No.: 12/367,463

(22) Filed: Feb. 6, 2009

(65) Prior Publication Data

US 2009/0151030 A1    Jun. 11, 2009

Related U.S. Application Data

(62) Division of application No. 11/495,162, filed on Jul. 28, 2006, now Pat. No. 7,500,387.

(30) Foreign Application Priority Data

Jul. 28, 2005  (EP) ..................................... 05447178
Aug. 30, 2005  (EP) ..................................... 05447195

(51) Int. Cl.
*G01Q 60/38* (2010.01)
(52) U.S. Cl. .......................................... 850/40; 850/33
(58) Field of Classification Search ............... 850/33–40
See application file for complete search history.

(56) References Cited

U.S. PATENT DOCUMENTS

| | | | |
|---|---|---|---|
| 5,347,226 A | | 9/1994 | Bachmann et al. |
| 5,475,318 A | | 12/1995 | Marcus et al. |
| 6,504,152 B2 | | 1/2003 | Hantschel et al. |
| 6,862,921 B2 | * | 3/2005 | Chand et al. ................... 73/105 |
| 6,912,892 B2 | * | 7/2005 | Lindig et al. ................... 73/105 |
| 7,240,428 B2 | | 7/2007 | Fouchier |
| 2002/0125427 A1 | | 9/2002 | Chand et al. |
| 2005/0133717 A1 | * | 6/2005 | Sadayama et al. ............ 250/307 |
| 2005/0146046 A1 | * | 7/2005 | Fouchier ....................... 257/773 |

FOREIGN PATENT DOCUMENTS

| EP | 0 899 538 A1 | 3/1999 |
|---|---|---|
| WO | WO 2004/015362 A2 | 2/2004 |

OTHER PUBLICATIONS

Pawlik, Marek, "Spreading resistance: A quantitative tool for process control and development," J. Vac. Sci. Technol. B 10(1), Jan./Feb. 1992 pp. 388.
Ried, Robert P., "Air-Bearing Sliders and Plane-Plane-Concave Tips for Atomic Force Microscope Cantilevers," Journal of Microelectromechanical Systems, vol. 9, No. 1, Mar. 2000.
Despont, M., et al., "Dual-Cantilever AFM Probe for Combining Fast and Coarse Imaging with High-Resolution Imaging," MicroElectroMechanical Systems 2000, Thirteenth International Conference, Jan. 27, 2000, pp. 126-131.

* cited by examiner

*Primary Examiner* — Jack Berman
*Assistant Examiner* — David E Smith
(74) *Attorney, Agent, or Firm* — Knobbe Martens Olson & Bear LLP

(57) ABSTRACT

One inventive aspect is related to an atomic force microscopy probe. The probe comprises a tip configuration with two probe tips on one cantilever arm. The probe tips are electrically isolated from each other and of approximately the same height with respect to the cantilever arm. The outer surface of the tip configuration has the shape of a body with a base plane and an apex. The body is divided into two sub-parts by a gap located approximately symmetrically with respect to the apex and approximately perpendicular to the base plane. Another inventive aspect related to methods for producing such an AFM probe.

16 Claims, 5 Drawing Sheets

DUAL TIP ATOMIC FORCE MICROSCOPY PROBE AND METHOD FOR PRODUCING SUCH A PROBE

CROSS REFERENCE TO RELATED APPLICATIONS

This application is a divisional of co-pending U.S. patent application Ser. No. 11/495,162, filed Jul. 28, 2006, and entitled "DUAL TIP ATOMIC FORCE MICROSCOPY PROBE AND METHOD FOR PRODUCING SUCH A PROBE", which is hereby incorporated by reference.

BACKGROUND OF THE INVENTION

1. Field of the Invention

The present invention is related to a dual tip atomic force miscroscopy (AFM) probe with two mutually isolated conductive tips in close vicinity, for example for use in local resistivity measurements or for determining dopant concentration of a semiconductor. The invention is equally related to a method for producing such a probe.

2. Description of the Related Technology

Resistivity measurements can be performed using one probe (with a back contact) to four conductive probes. In the four-point probe case, current is supplied through the outer two probes while a voltmeter measures the voltage across the inner two to determine the sample's resistivity. While this method is very accurate, its spacial resolution is typically poor and it is normally used to measure the resistivity of uniform materials and thin films.

Resistivity measurements can also be performed between two probes at the expense of accuracy since the measured resistance then includes the contact resistances between the probes and the sample in addition to the sample's resistance. Depth dopant profiles are often measured using such a two-probe technique then referred to as a spreading resistance probe (SRP) technique, described in "Spreading resistance: A quantitative tool for process control and development", M. Pawlik, J. Vac. Sci. Technol. B 10, 388 (1992). In this case, two probes are displaced in parallel on the sample along the concentration gradient while the resistance between the two is measured. The carrier concentration is then extracted from the resistance. In order to improve the depth resolution, the probes are displaced on a small angle bevel rather than on a cross-section. The resolution and accuracy of the SRP measurement is closely related to the distance between the two probes: the smaller this distance and the smaller the size of the tip's contact zone, the higher are the accuracy and spatial resolution.

In a classic SRP tool, the distance between the two probes is at least 10 µm. The total size of the contact is in the order of 1 µm. The force applied on the probes is about 20 mN. The probes are made out of metal (i.e. OsW). To improve accuracy of the measurement, multiple tip AFM probes have been proposed which allow an SRP measurement with high resolution, in an AFM tool. Document EP899538 for example, discloses an AFM probe with two tips on one cantilever, wherein the tips are created by making two adjacent molds. This complex solution does not allow however to reduce the distance between the tips to the order of 100 nm, as required by current accuracy and resolution requirements.

In the document 'Air-Bearing Sliders and Plane-Plane-Concave Tips for Atomic Force Microscope Cantilevers', R. P. Ried et al., Journal of Microelectromechanical systems, vol. 9, no. 1, March 2000, a method is disclosed wherein a single tip is produced by forming and filling a mold in a Si-substrate. The mold is formed by producing a trench in a Si-substrate, filling the trench, patterning an opening in the trench-filling material to one side of the trench, and isotropically etching the Si at the opening. However, the mask alignment for creating the opening needs to be extremely accurate, in order to be able to control the height of the resulting tip.

It is desirable to provide a dual tip AFM probe with electrically insulated tips, wherein the tips are robust and at a smaller distance from each other than in prior art devices, and methods for producing such an AFM probe.

SUMMARY OF CERTAIN INVENTIVE ASPECTS

Certain inventive aspects are related to an atomic force microscopy probe and to methods of making the same. The probe comprises a tip configuration with two probe tips on one cantilever arm. The tip configuration has the shape of a body with an apex (or tip) and a base plane, such as a pyramid or a cone, but with a gap dividing the body in two parts, the gap being situated symmetrically with respect to the apex. This apex is therefore no longer physically present in the final tip configuration.

In other words, the tip configuration consists of two mutually symmetrical tip parts, both having the shape of a pyramid or a cone, of which a part has been cut away along a cutting surface (flat in at least one dimension) approximately perpendicular to the pyramid or cone's base plane. In the tip configuration, the cutting planes of these tip parts are facing each other, with a small gap between them, the walls of the gap being perpendicular to the common base plane of the tip parts and the tips of the tip parts being at a small distance from each other, defined by the shape and dimensions of the gap. In a probe according to one inventive aspect, the tip parts are approximately at the same height with respect to the cantilever arm of the probe.

DETAILED DESCRIPTION OF CERTAIN ILLUSTRATIVE EMBODIMENTS

Figure 1:
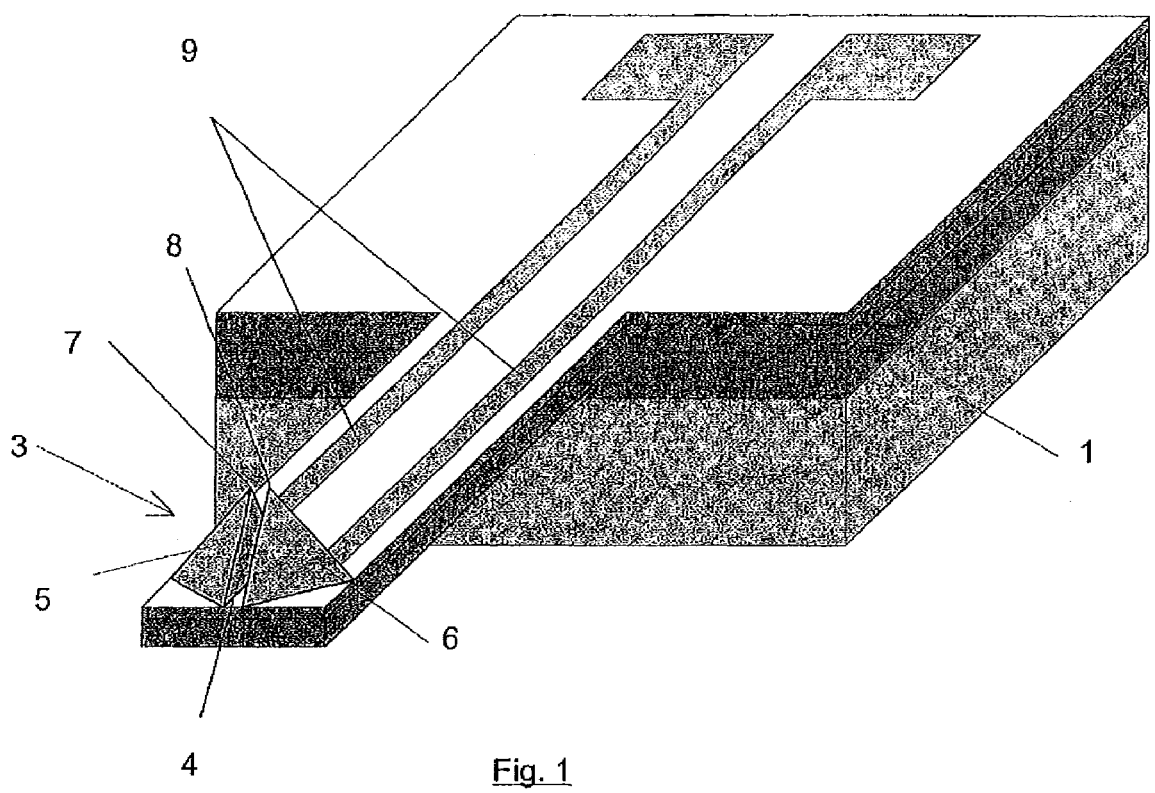
FIG. 1 shows a picture of a dual tip probe according to one embodiment.

One embodiment of an AFM probe is shown in FIG. 1. The probe comprises a holder body 1, a cantilever 2 and a tip configuration 3. The tip configuration has the shape of a four-sided pyramid which has been cut in two along a diagonal of the pyramid. A vertical gap 4 (i.e. perpendicular/orthogonal to the base plane of the pyramid), with approximately parallel walls separates the two tip parts 5 and 6. The gap thereby also defines the location and the spacing of the adjacent tips 7 and 8 of the dual probe. The probe tip parts 5 and 6 are produced from or are at least covered by a conductive material, e.g. hard metal or diamond, and connected to contact lines 9. At the same time, the probe tip parts 5 and 6 are mutually isolated from each other.

This type of dual tip probe provides two tips which can be placed at a very small distance from each other. Different production techniques are possible, as will be explained further, but by using the process involving trench formation and anisotropic etching, the gap 4 can be as narrow as 100 nm. Even smaller distances can be obtained when the probe is produced by using a FIB. Meanwhile, the tip parts 5 and 6 are still mechanically robust, while exhibiting very sharp tips, e.g. a radius of curvature of less than 50 nm. This type of dual tip AFM probe therefore clearly solves the problems of prior art devices.

The shape of the tip configuration is not limited to a four-sided pyramid. Any similar shape might be used as well, e.g. a cone or a pyramid with a different number of side planes. The scope of some embodiments extends to any tip configuration having an outer surface with the shape of a body with a base plane and an apex, which is divided into two sub-parts by a preferably parallel-walled gap located approximately symmetrically with respect to the apex and which is approximately perpendicular to the base plane.

The material used for the tip parts can be doped diamond, metal (e.g. Pt, Os, Ru, Ir, Au, Cr), hardmetal (e.g. TiN, TiC, WC, TaN) or metal oxide (e.g. $IrO_2$). In one embodiment, the tip parts are not totally filled with material but only comprise a certain thickness of the tip material, along the surface of the tip parts, as shown in FIG. 2l.

According to a first embodiment, the AFM probe is produced by a method, which is illustrated in FIGS. 2 and 3. The method is described for a Si-substrate, even though any other suitable material may be used as well. In some embodiments, the substrate material may be anistropically etchable, i.e. by crystal-orientation dependent etching.

First, patterning of a symmetric mold is performed as described below.

Figure 2A:
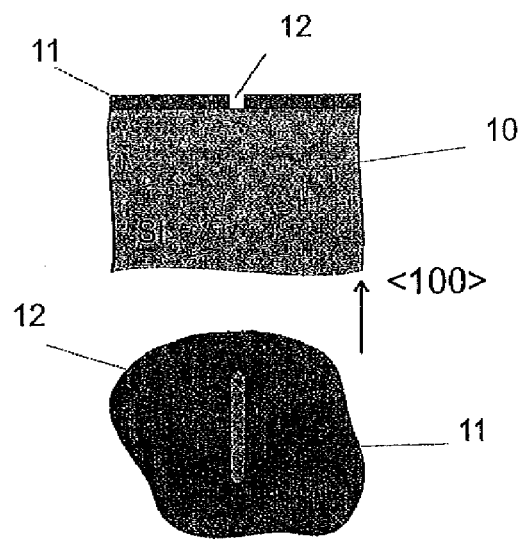
FIG. 2 shows a flowchart of an embodiment of a method according to which a probe can be produced.

In FIG. 2a, a Si-substrate 10 is provided, and a hard mask layer 11 (e.g. Si-oxide or Si-nitride) is deposited on the substrate and patterned to form an elongated opening 12, oriented in the <100> direction of the Si substrate.

Figure 2B:
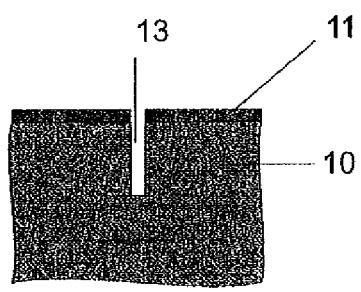

In FIG. 2b, a deep trench 13 is etched into the silicon. The walls of the trench are approximately perpendicular to the substrate surface into which the trench has been etched.

Figure 2C:
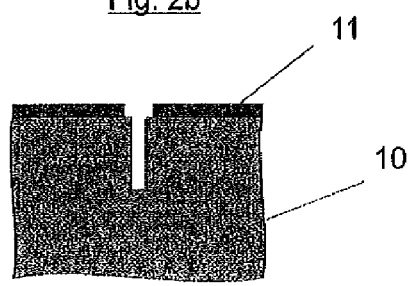

In FIG. 2c, optionally, the hard mask opening 12 is enlarged by an isotropic etch.

Figure 2D:
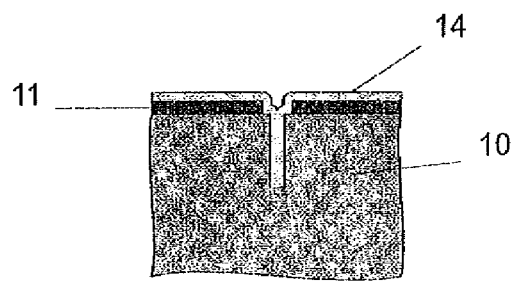

In FIG. 2d, the trench 13 is filled with a material (14) which is resistant to anisotropic etching of the substrate material, possibly with silicon oxide or silicon nitride.

Figure 2E:
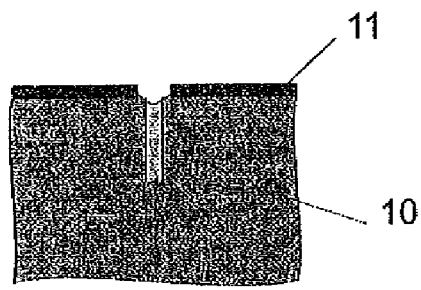

In FIG. 2e, by a dry or a wet etching process, the trench material deposited on the surface of the substrate is etched back, leaving only trench material in the trench itself. At the end of this process, at least some Si needs to be exposed at the top of the trench.

Figure 2F:
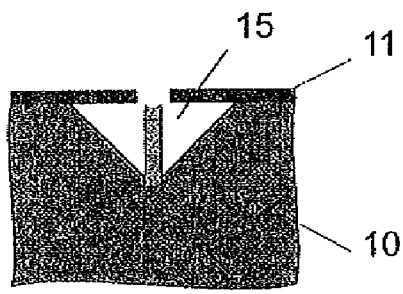

In FIG. 2f, the substrate material (Si in the illustrated case) is etched in an anisotropic etchant, e.g. KOH, TMAH, EDP. The substrate is thereby etched under the hardmask 11 to form a mold 15 in the shape of a four-sided pyramid, with a vertical wall 21 formed by the trench filling material 14 in the middle, separating two approximately symmetric halves of the mold. The etching stops, or is in any case greatly slowed down, when the diagonal H of the square-shaped base of the four-sided pyramid in the direction perpendicular to the trench is equal to the length L of the trench. In some embodiments, for the two tip parts to be fully separated, the depth of the filled trench may be at least half this diagonal.

Figure 2G:
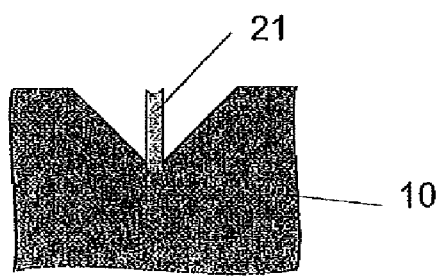
Figure 2G:
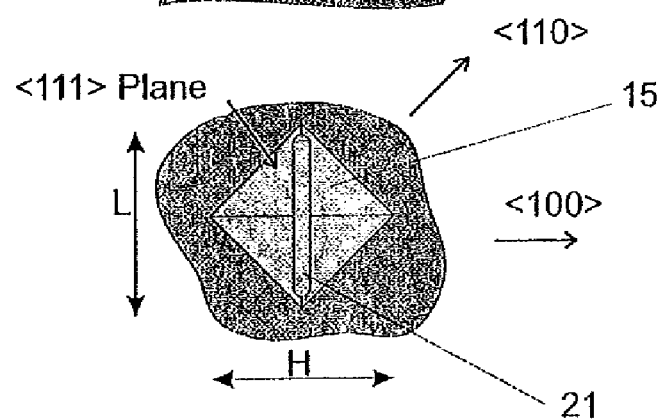

In FIG. 2g, the hardmask 11 is etched away, at least above the pyramidal mold 15, leaving the pyramidal mold 15, the vertical wall running through its center.

Then, tips are formed as described below.

Figure 2H:
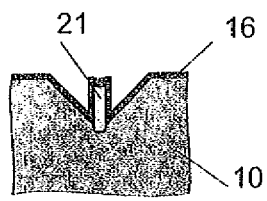

In FIG. 2h, a conductive material 16 is deposited on the inner surface of the pyramidal mold, the wall and the surrounding substrate. The conductive material may be resistant to etching of the trench fill material and of the substrate.

Figure 2I:
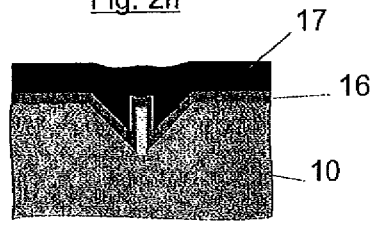

In FIG. 2i, a resist layer 17 is spinned on top of the conductive material, to planarize the surface of the substrate in which the mold is formed.

Figure 2J:
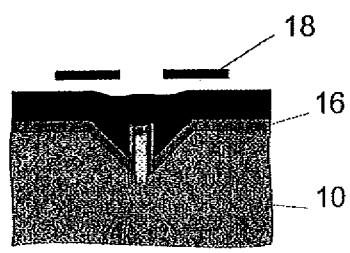

In FIG. 2j, the resist is exposed, optionally through an additional mask 18.

Figure 2K:
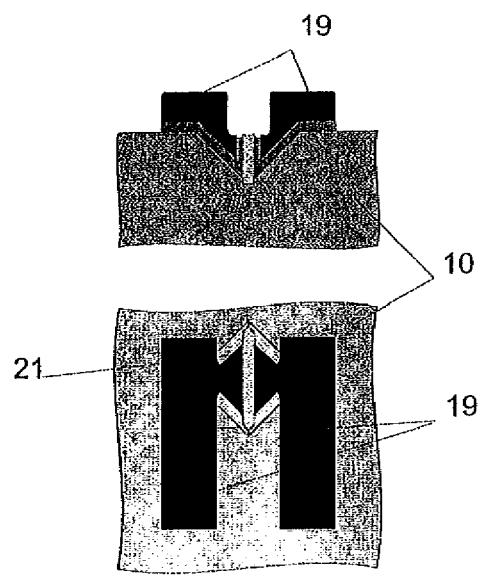
Figure 2L:
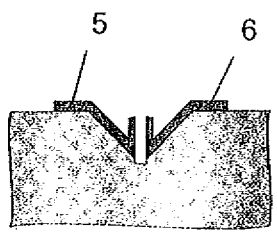

In FIG. 2k, the resist 17 is developed, leaving resist material only in the mold, or, when an additional mask was used, in the mold and in a region 19 surrounding the mold. This region may have a shape with two legs as shown in the figure, which will facilitate the processing of contact lines towards the tip parts. After this, the conducting material is etched away around the mold or around the mold and area 19, and on top of the wall material in the trench. The latter is necessary to obtain two electrically isolated tip parts. As a result, conducting material is left at least inside, i.e. on the inner surface of the mold. In the embodiment shown, conductive material is left on the slanted surfaces of the mold and on the flanks of the wall 21. In the figure, conductive material is equally left in the area 19 around the mold.

In FIG. 2l, the resist material in the mold is etched away. The wall material is equally etched away. This results in the finished tip parts 5 and 6, as shown in the figure.

After this, a number of additional processes are required to produce contact lines, the cantilever arm and holder, and to release the finished probe from the substrate. These processes can be performed according to a known method.

In stead of spinning and developing the resist layer 17, it is also possible to etch back the resist layer until the conductive layer on the substrate and the wall 21 is removed. In still another way, a thick layer of conductive material 16, e.g. a diamond layer, might be deposited on top of the mold, and subsequently etched back until the conductive material is removed from the substrate surface and the top of the wall 14, leaving conductive material only inside the mold.

Figure 3A:
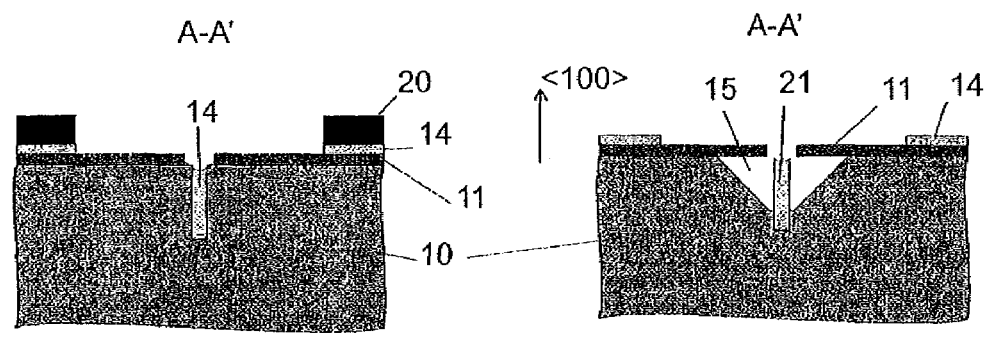
FIG. 3 illustrates an additional process which may be performed according to one embodiment.
Figure 3B:
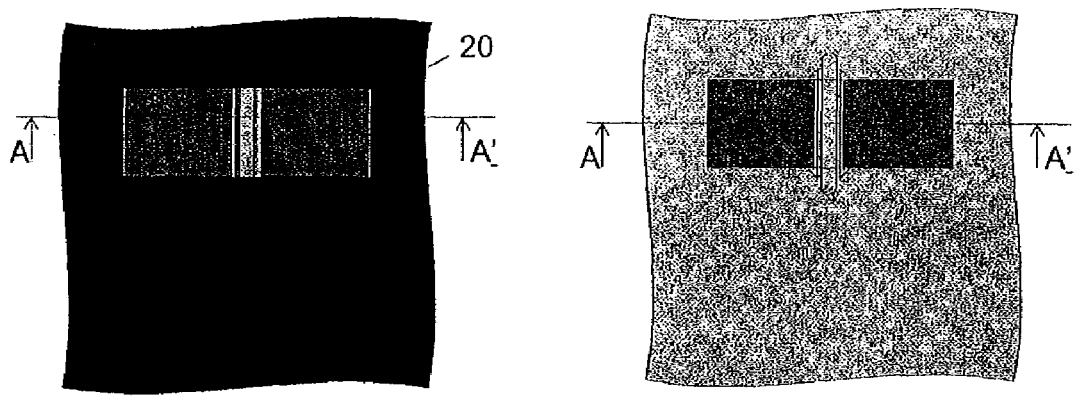
Figure 3C:
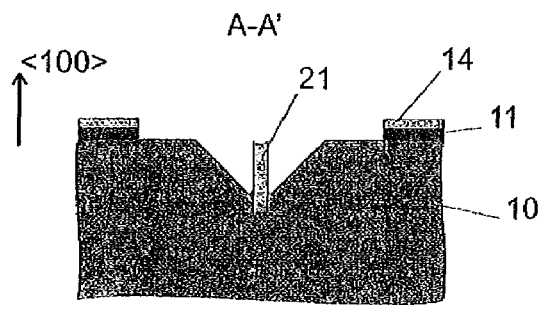
Figure 3C:
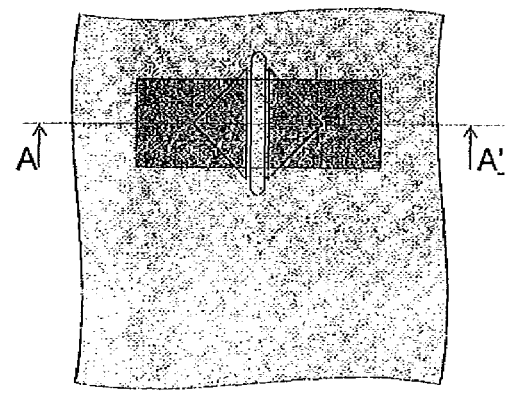

In the method described above, it may be advantageous to add a process after filling the trench (at FIG. 2d). At this point, as shown in FIG. 3a, a resist material 20 may be applied and patterned using lithography, to cover the longitudinal ends of the elongated opening 12 during the trench material 14 etch back. The covering of the longitudinal ends of the opening will ensure a better control of the anisotropic etching near the end of this etching process: etching will end when the diagonal has the same length as the exposed part of the opening. Otherwise, the processes remain the same, when this additional masking process is applied, as illustrated by FIGS. 3b and 3c.

An advantage of anisotropically etching a dual probe in the manner described above, is that the process allows a perfect control over the height of the probe tip parts 5 and 6. This height is defined only by the length of the elongated opening (or what remains of it after the ends are covered as in FIG. 3). The anisotropic etch takes place in both directions (perpendicular to the surface of the substrate 10 and perpendicular to the wall 21) simultaneously, and is stopped as soon as the diagonal perpendicular to the wall 21 has the same length as the wall (or its uncovered part). Provided that the wall is accurately aligned with the <100> direction, the anisotropic etching process yields two identical and symmetrical mold parts, whose depth is defined by the length of the wall. This technique does therefore not encounter the difficulty of aligning a mask with respect to the filled trench, as was the case for the prior art technique described by Ried et al.

Another approach to produce an AFM probe according to one embodiment, is to produce a single tip by a known technique, followed by the process of cutting this tip into two tip parts, by a known cutting technique, e.g. a Focused Ion Beam (FIB) technique, i.e. using a beam with ionized particles capable of removing material from a substrate.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An atomic force microscopy probe comprising:
a tip configuration comprising two probe tips on a cantilever arm, the probe tips being electrically isolated from each other and having approximately the same height with respect to the cantilever arm, the outer surface of the tip configuration having the shape of a body with a base plane and an apex, the body being divided into two sub-parts by a gap located approximately symmetrically with respect to the apex and approximately perpendicular to the base plane,
wherein the body is a four-walled pyramid, and wherein one diagonal of the approximately square-shaped base of the pyramid approximately coincides with the longitudinal center line of the gap.

2. The probe according to claim 1, wherein the gap comprises parallel walls.

3. The probe according to claim 1, wherein the gap is approximately parallel to the longitudinal direction of the cantilever arm.

4. The probe according to claim 1, wherein the gap is about 100 nm wide.

5. The probe according to claim 1, wherein the tips are formed from at least one of the following: doped diamond, metal, and metal oxide.

6. The probe according to claim 1, where the gap is in the middle of the body.

7. A method of producing a probe, the probe comprising a tip configuration with two probe tips on one cantilever arm, the method comprising:
producing an atomic force microscopy probe with a single probe tip, formed as a body with a tip and a base plane, and
cutting the body into two sub parts along a surface approximately perpendicular to the base plane and going through the tip such that the two sub parts are separated by a gap located approximately symmetrically with respect to the tip of the body and approximately perpendicular to the base plan,
wherein the body is a four-walled pyramid, and wherein one diagonal of the approximately square-shaped base of the pyramid approximately coincides with the longitudinal center line of the gap.

8. The method according to claim 7, wherein the gap comprises parallel walls.

9. The method according to claim 7, wherein the gap is approximately parallel to the longitudinal direction of the cantilever arm.

10. The method according to claim 7, wherein the cutting of the body is performed by a focused ion beam process.

11. The method according to claim 7, wherein the gap is about 100 nm wide.

12. The method according to claim 7, wherein the single probe tip is formed from conductive material.

13. The method according to claim 7, wherein the single probe tip is formed from at least one of the following: doped diamond, metal, and metal oxide.

14. The method according to claim 7, where the gap is in the middle of the body.

15. The method according to claim 7, wherein the two sub parts are electrically isolated from each other and have approximately the same height with respect to the cantilever arm.

16. The probe as produced by the method according to claim 7.

* * * * *